(12) United States Patent
Quittek et al.

(10) Patent No.: US 8,099,489 B2
(45) Date of Patent: Jan. 17, 2012

(54) NETWORK MONITORING METHOD AND SYSTEM

(75) Inventors: Jurgen Quittek, Heidelberg (DE); Marcus Brunner, Heidelberg (DE)

(73) Assignee: NEC Corporation, Tokyo (JP)

( * ) Notice: Subject to any disclaimer, the term of this patent is extended or adjusted under 35 U.S.C. 154(b) by 1613 days.

(21) Appl. No.: 10/965,956

(22) Filed: Oct. 18, 2004

(65) Prior Publication Data

US 2005/0086337 A1    Apr. 21, 2005

(30) Foreign Application Priority Data

Oct. 17, 2003  (DE) .................. 103 49 005

(51) Int. Cl.
  *G06F 15/173* (2006.01)
(52) U.S. Cl. ........................................ 709/224
(58) Field of Classification Search ............ 709/224
  See application file for complete search history.

(56) References Cited

U.S. PATENT DOCUMENTS

| | | | | |
|---|---|---|---|---|
| 5,600,632 | A * | 2/1997 | Schulman | 370/252 |
| 6,604,208 | B1 * | 8/2003 | Gosselin et al. | 714/4 |
| 2003/0023722 | A1 * | 1/2003 | Vinberg | 709/224 |
| 2003/0135609 | A1 * | 7/2003 | Carlson et al. | 709/224 |
| 2003/0200302 | A1 * | 10/2003 | Tanaka | 709/223 |
| 2004/0088404 | A1 * | 5/2004 | Aggarwal | 709/224 |
| 2006/0031481 | A1 * | 2/2006 | Patrick et al. | 709/224 |
| 2006/0059211 | A1 * | 3/2006 | Futatsugi | 707/204 |

FOREIGN PATENT DOCUMENTS

| | | |
|---|---|---|
| JP | 8-228211 | 9/1996 |
| JP | 9-223092 | 8/1997 |
| JP | 9-298543 | 11/1997 |
| JP | 2001-109686 | 4/2001 |
| JP | 2002-140240 | 5/2002 |

OTHER PUBLICATIONS

International Telecommunication Union (ITU-T), X.753 (Oct. 1997), Series X: Data Networks and Open System Communication, OSI management—Management functions, Information technology—Open System Interconnection—Systems management: Command sequencer for systems management.
G. Goldszmidt et al.: "Distributed Management by Delegation", In Proceedings of the 15th International Conference on Distributed Computing Systems, Jun. 1995.

* cited by examiner

*Primary Examiner* — Kenny Lin
*Assistant Examiner* — Shripal K Khajuria
(74) *Attorney, Agent, or Firm* — Young & Thompson

(57) ABSTRACT

A method of monitoring a network, in particular a data or telecommunication network, where the network includes a number of units to be monitored, and where relevant states of these units are controlled with respect to functionality, efficiency and/or security by means of provided information elements called managed objects at the monitored units, that reflect states and/or parameters to be monitored, and that are read and/or written by a network management system using network management protocols, is characterized in that at the managed units an additional management object—the health check object—is being implemented, such that almost all relevant states of the respective monitored unit are aggregated into a single value, that can be read by the network management system.

25 Claims, 3 Drawing Sheets

NETWORK MONITORING METHOD AND SYSTEM

BACKGROUND OF THE INVENTION

1. Field of the Invention

The present invention relates to a method for monitoring a network, particularly data or communication network, where the network includes a plurality of units to be monitored, and where relevant states of these monitored units are controlled with respect to functionality, efficiency and/or security by means of provided information elements called managed objects at the monitored units, that reflect states to be monitored, and that are read and/or written by a network management system using a predetermined network management protocol.

2. Description of the Related Art

Facing complexity and size of today's data and telecommunication networks, the importance of effective network management, particularly of effective network monitoring, is becoming increasingly higher. For network management, many of today's data and telecommunication networks use a network management system (NMS) that communicates with a number of monitored units (MU's) in the network. Monitored units are devices of any kind, i.e. server, hosts, routers, etc. For communication between NMS and MU, in general, standardized network management protocols may be used, as for example Simple Network Management Protocol (SNMP) that is common in IP (Internet Protocol) -based networks and the Common Management Information Protocol (CMIP) that is common in telecommunication networks.

As part of its network monitoring activities, the NMS reads or writes managed objects (MO's) at the monitored units and in turn the monitored units send notifications back to the NMS. A monitored unit MO is an information unit with clearly defined semantics, that is implemented as a passive memory cell at a MU and that directly corresponds to the MU. A managed object MO may be for example a counter, a string of text characters, or something else of this kind, which can indicate, for example, the current status of a communication link connected to the corresponding MU. By reading managed objects MO's from a particular managed unit, the NMS can retrieve information about the current status of the monitored unit at which the MO's are implemented, for example on the status of a communication link. By writing to particular MO's, the NMS can change status or configuration of a MU, for example by setting the status of a communication link to 'inactive.'

In order to achieve interoperability between NMS and monitored units of different manufacturers, MO's are standardized, for example in recommendations of the International Telecommunications Union (ITU) and in Requests for Comments (RFC's) of the Internet Engineering Task Force (IETF). In these standard documents, MO's are defined in a way that a NMS can receive sufficient and appropriately detailed information on the managed units. For example, there is a monitored object MO indicating the link status for each link connected to the managed unit.

Monitoring communication networks in operation includes regularly checking network status and configuration. For this purpose, a pre-definable number of MO's must be read from each managed unit MU, where always the most current value must be read from the MU. For each of these MO's, an operation is required that checks whether or not the value of the individual MO—representing a relevant status with respect to functionality, efficiency and/or security of the network—or a combination of this value with values of other MO's is within acceptable limits for normal operations. If one of the values exceeds the limit, then the NMS must become active in order to return to normal operations. A set of all operations for checking whether or not all values of MO's in a MU are within the acceptable limits for normal operations is called 'health check.'

In this context, it is problematic that checking all relevant MO's at all monitored units can cause scalability problems in the case where the number of monitored units becomes too large. The total number of MO's to be monitored is the product of the number of monitored units and the average number of MO's selected per monitored unit. A NMS has a limit for this total number; if the limit is exceeded, a network cannot be monitored in a sufficient way. Hence, for a fixed number of MO's to be monitored per monitored unit, the number of units to be monitored is limited.

A known approach to avoiding this problem is the reduction of MO's to be monitored per MU based on programmability of monitored units, which allows a NMS to load programs on monitored units. Such a program performs a 'health check' locally at a MU, either for the respective MU only or also for a limited number of further monitored units. This approach is called "Management by Delegation (MbD)." See German Goldszmidt and Yechiam Yemini "Distributed Management by Delegation" (In proceedings of the 15th International Conference on Distributed Computing Systems, June 1995).

Three technologies realizing the approach of Management by Delegation have been studied, implemented and standardized.

The ITU has developed the so-called Command Sequencer for telecommunication networks, which is documented in ITU-T recommendation X.753. The Command Sequencer allows loading complex programs on monitored units, provided that the programs are to be written in a specific programming language that is part of the standard.

The IETF has standardized a more flexible technology called Script MIB that is documented in IETF RFC 3165. It allows loading of in arbitrary programming languages and for arbitrary runtime environments, as far as they are supported by the respective MU.

The IETF also has developed a simpler and functionally more restricted technology called Expression MIB that is documented in IETF RFC 2982. The Expression MIB allows a NMS to create simple expressions consisting of operations on MO's. These expressions can be used recursively for creating more complex expressions, for example a complete health check of a MU.

The above-described method based on Management by Delegation can reduce the number of MO's to be read, but at the same time, it has several drawbacks.

First, the manufacturing costs increase, because all monitored units must be extended by a program loader and a runtime environment for loaded programs. Furthermore, the complexity of the entire NMS increases, since programs for the local 'health check' must be provided in programming languages or for runtime environments that are available at the monitored units. Hence, several software components in different programming languages and/or for different runtime systems need to be developed and maintained.

Second, security problems arise such that an unauthorized person or system may load and start harmful programs. Accordingly, loading of arbitrary programs must be strictly controlled. Several security mechanisms are required for this, leading again to an increase of cost and complexity. More specifically, loading of programs on monitored units must be restricted and controlled. Access of running programs to MO's must be appropriately restricted and controlled. For example, write access to monitored MO's should be blocked. Furthermore, the runtime environment must be restricted such that programs cannot access other resources of monitored units.

The techniques of Command Sequencer and Script MIB as described above have a few organizations, but they were never used to monitor large networks, because of the above-mentioned drawbacks.

The technique of Expression MIB as described above is less costly, less complex and easier to secure, compared with Script MIB and Command Sequencer, but the problems described above are not sufficiently reduced, which prevents this technology from being deployed in large networks with the result that the IETF does not recommend anymore to implement it.

SUMMARY OF THE INVENTION

An object of the present invention is to provide network monitoring method and system, which can achieve network monitoring with high efficiency and security even in the case of large networks.

According to the present invention, in each monitored unit an additional managed object—'health check' object—is implemented, that unifies or aggregates all relevant states of the monitored unit into a single value that can be read by the network management system.

Since an increase of scalability can be realized with high cost-performance and non-critical concerning security, large networks can be monitored efficiently.

From the view of the invention, it was recognized that conventional approaches to monitoring of networks, particularly of large, complex network architectures, are not feasible because of scalability problems.

According to the present invention, the introduction of an additional managed object—so called 'health check' object—at the monitored units allows the NMS to only read a single managed object—namely 'health check' object—instead of a large number of MO's.

According to the invention, the 'health check' object is implemented such that almost all relevant states of the respective monitored unit are unified or aggregated into a single value, that indicates the total result of the 'health check'. The result is that significantly larger networks can be managed by a single NMS.

Also, the invention can provide remarkable improvement in security, compared to the conventional methods, because neither arbitrary programs nor expressions are transmitted. In contrast to technologies such as the Command Sequencer or the Script MIB, it is not possible according to the present invention that unauthorized persons or systems for example, load harmful programs to a MU, which affect the operation thereof.

DESCRIPTION OF THE PREFERRED EMBODIMENTS

Figure 1:
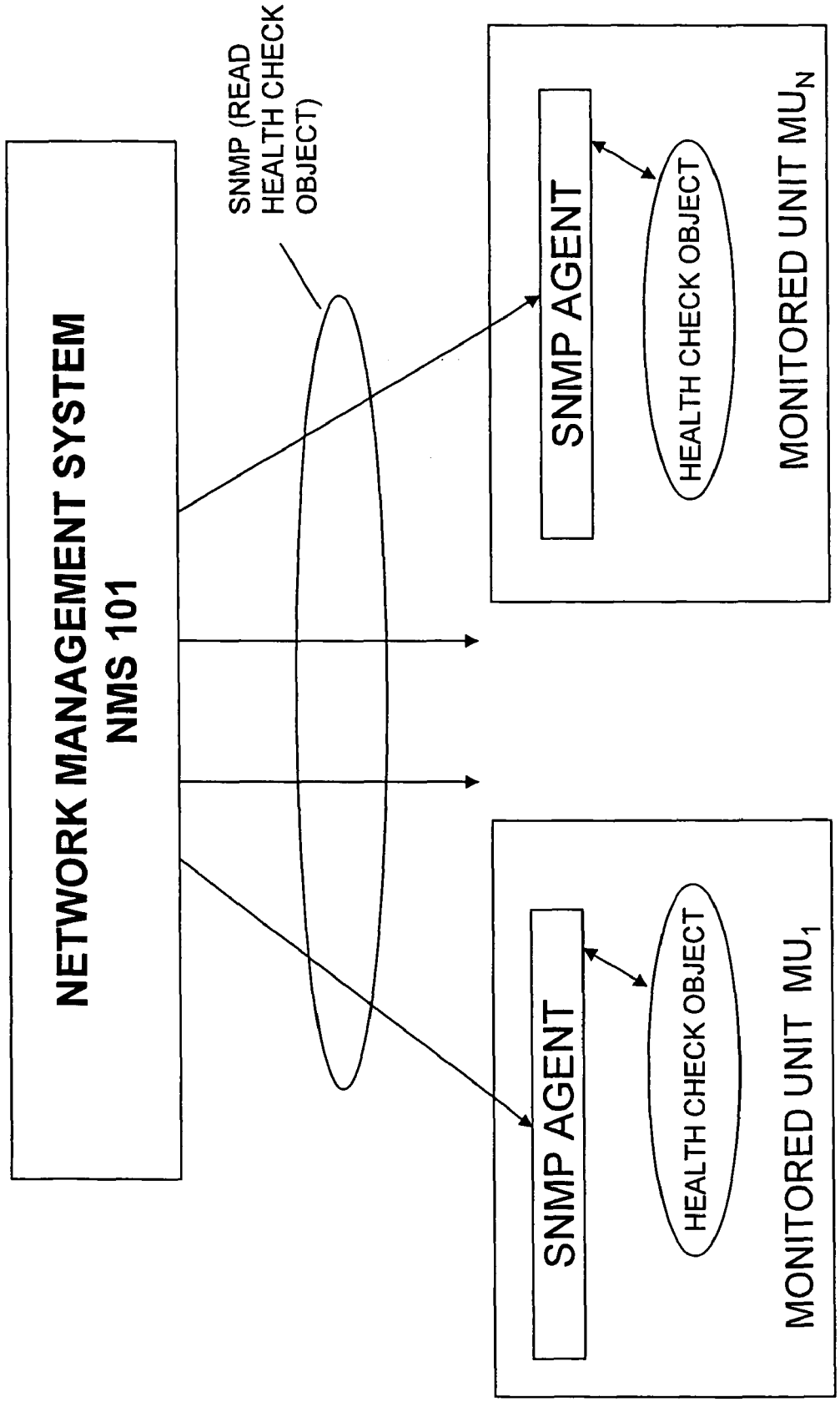
FIG. 1 is a block diagram schematically showing the structure of a network monitoring system according to an embodiment of the present invention.

Referring to FIG. 1, a network management station (NMS) 101 manages a plurality of managed units $MU_1$-$MU_N$ in a network. Each managed unit MU is any kind of network element (NE) such as a server, host computer or router. Communication between NMS and each MU is made using a network management protocol (here, SNMP: Simple Network Management Protocol).

Each managed unit MU has a SNMP agent as a resident process implemented therein. The SNMP agent manages MIB objects including health check object that will be described later and, in response to a request of a SNMP manager on the NMS 101, sends the health check object back to the SNMP manger.

Figure 2:
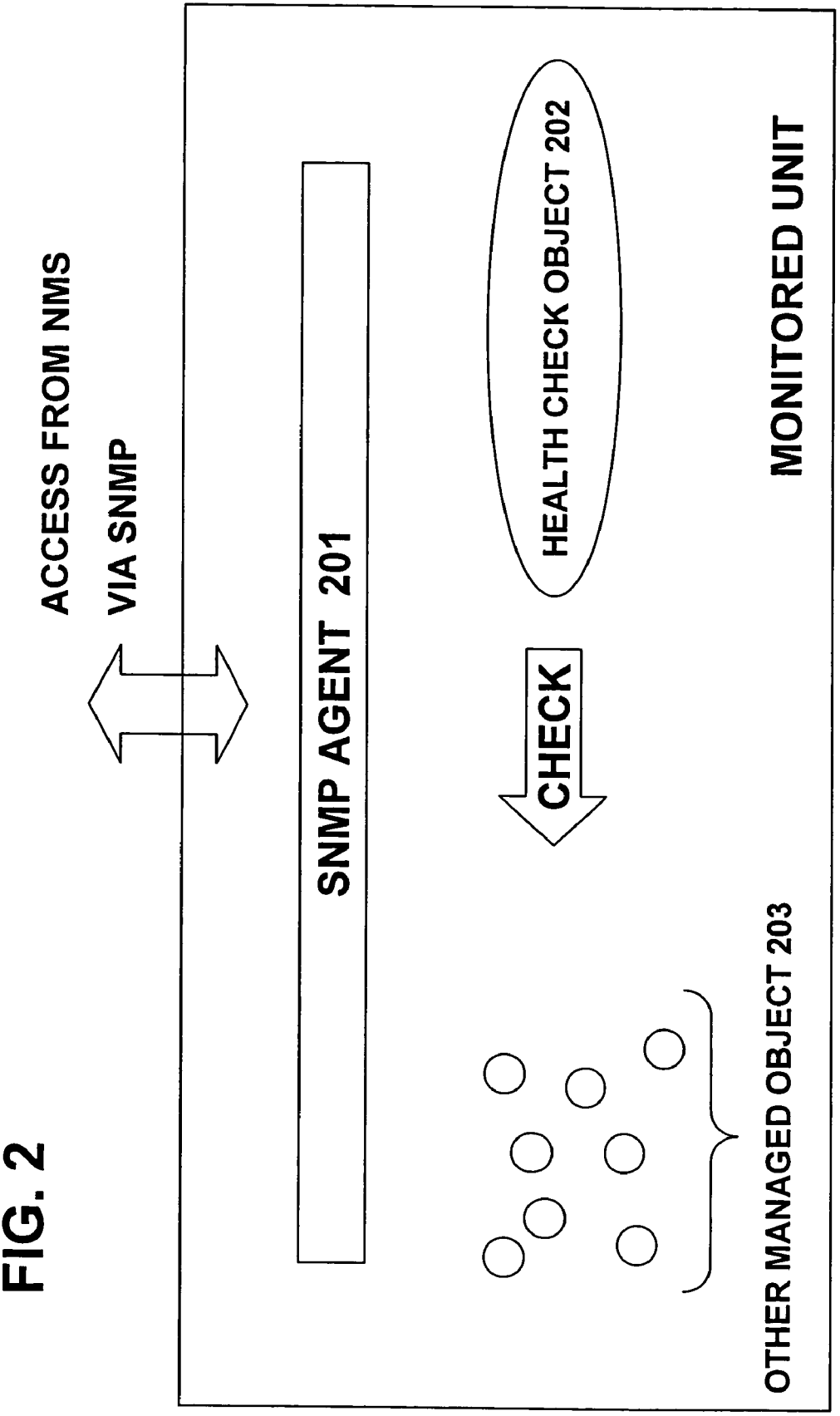
FIG. 2 is a schematic diagram showing the functional structure of processes and objects implemented in a monitored unit in the embodiment.

As shown in FIG. 2, the SNMP agent 201 is implemented in the managed unit MU as a resident process generated by running a program on a processor (not shown). The SNMP agent 201 manages a health check object 202 and other managed objects 203 including statistics data and status variables as managed objects of that managed unit.

The health check object 202 checks the other managed objects 203 at regular intervals or as necessary, and sends the resultant health check object back to the SNMP manager in response to the request.

In a case where some failures or status changes occur at the managed unit, a value calculated based on such an event is stored in the health check object 202 and then the SNMP agent 201 accesses the value stored in the health check object 202 to send it to the SNMP manager on the network management station (NMS) 101. The NMS 101 can identify the cause of the error by looking at the event-dependent value held in the health check object 202, so that the NMS 101 can reconfigure the managed unit.

Figure 3:
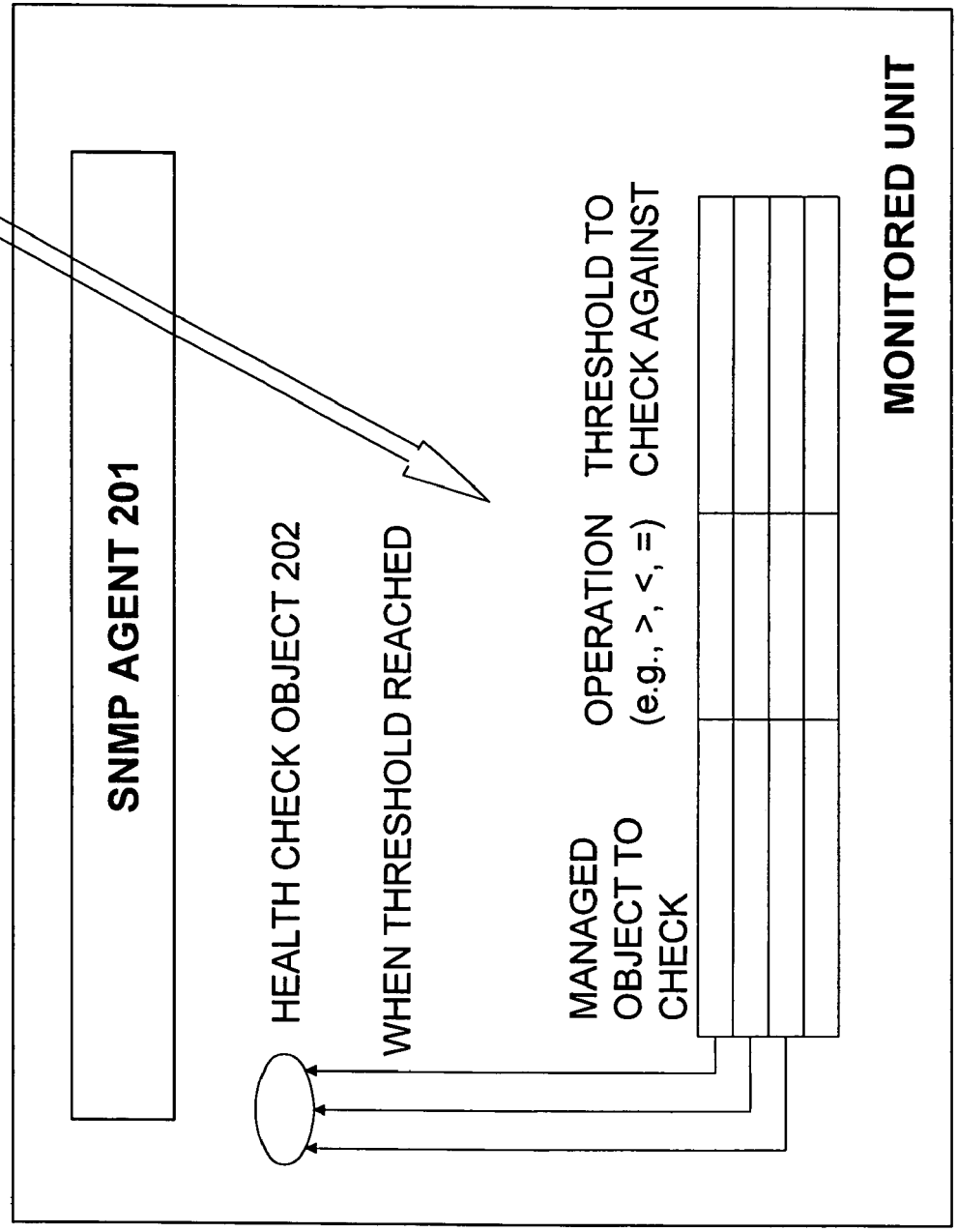
FIG. 3 is a schematic diagram showing calculation of health check object in the embodiment.

Referring to FIG. 3, the NMS 101 sets check thresholds and managed object identifiers to be checked on a managed unit. A managed object value is compared to a corresponding check threshold and, when at least one managed object value has reached the corresponding threshold, the value of the health check object is set.

An advantageous implementation could set individual limits for each MO that is included in the computation of a 'health check', for example as maximum and minimum values and/or as a set of regular status values. Regular status values correspond to states at which functional, error-free operation of the network is indicated. In such a case, additional MO's can indicate the limits and/or status values. For an MO, that for example indicates the status of a communication line by either the value 'on' or the value 'off', it is not necessary to indicate the set of regular status values. For such MO's regular state values could be fixed and they could be standardized.

However, for most of the other MO's that are included in the 'health check' a flexible choice of limits and regular states is very extremely useful. Particularly, limits can be implemented such that they can be chosen by a NMS. For performance monitoring for example, different operators typically choose different threshold values for the maximum load allowed on a communication link in order to fulfill different quality requirements.

With respect to a simple and efficient analysis of the results, a 'health check' object could be implemented such that it either indicates that all states at the monitored unit are within the regular limits or that at least one status exceeds the regular limits. In the latter case, the MO's of the respective monitored unit could be analyzed further, while in the former case no further operation are required.

For achieving high flexibility and an easy and smooth adaptation to different requirements a set of MO's could be selected, which are to be considered when computing the 'health check'. This way, certain aspects of network monitoring could be emphasized based on the selection of MO's. For this purpose further MO's could be introduced, that indicate which MO's are to be considered in the 'health check'. Some of these additional MO's could be static, others could be configurable by the NMS.

Flexibility and complexity of the computation of a health check object could be restricted and partially fixed in a way that is advantageous compared to known technologies. This would save cost and reduce the required computational power. The operations performed for computing the health check object could for example be restricted to comparison operations with threshold, values or regular states. In this case, the NMS would just configure the set of MO's to be compared and the set of thresholds and/or states to which the MO's are compared. This would also restrict the arguments on which operations act: one argument would be the MO at a MU, the other argument would be one or more selectable threshold or status values to compare the MO to. Such a restriction will disburden the network management, because only the values to compare to need to be known and specified.

A further improvement of the invention uses several health check objects at a single MU. This is particularly advantageous if several NMS's serving different purposes manage and monitor the same network. In many cases, a NMS for monitoring the network configuration is separated from a NMS for monitoring network performance and they monitor different sets of MO's at a MU. In such a case, each NMS could create its own health check object. Even if configuration monitoring and performance monitoring are performed by the same NMS, the NMS could create two different health check objects.

With respect to highly efficient network monitoring, health check objects could be hierarchically structured. Particularly if the health check at a MU consists of several groups of checks that can be clearly separated, then for each of these groups an individual health check object could be created. The total result of the entire health check could be represented by a single higher level health check object that includes only the values of lower level health check objects in its computation. The hierarchical decomposition of the health check object could be decomposed further in a recursive way such that more than two hierarchy levels are created.

With respect to enhanced expressiveness of the conducted health check, weights could be assigned to the comparison operations that are performed for the individual MO's to be included in the computation of the health check object. The weights could reflect that for the MO's included in the health check the significance of exceeding the thresholds can be different. By introducing further managed objects a weight could be assigned to every comparison operation that is part of the health check. The value of the health check object could then be, for example, the maximum of all weights of MO's for which the value exceeds the assigned thresholds, or it could be the sum of all these weights. If no MO exceeds its thresholds, then this fact could be indicated by setting the value of the health check object to zero.

As an alternative to the procedure that the NMS periodically checks the value of a health check object, a MU could take an active role and perform the health check periodically with a given time interval. If the result of the check is a value indicating that at least one of the checked MO's exceeds its thresholds to indicate an abnormal condition of the computation, a MU could send a notification to the NMS. A threshold for the value of the health check object could be specified such that a notification is sent if the value of the health check object exceeds the threshold.

In order to make it easy to identify a malfunction quickly after the health check has indicated its existence, a notification containing a hint to the malfunction could be sent, for example, together with the failed health check. This hint could for instance consist of the list of MO's with values exceeding the respective thresholds. With such information given, the NMS can initiate actions dealing with the fault more quickly and more appropriately. Without such information, the NMS would have to repeat the health check explicitly, i.e. it would have to read each MO included in the health check and check the MO's value. Therefore, it is advantageous in several cases to introduce further MO's indicating for which of the MO's included in the health check the comparison with thresholds failed. In such a case, the network management system NMS can quickly reconfigure the monitored units with the erroneous managed objects in order to return to fully functional operation.

In a particularly advantageous way, the range of MO's at a MU, which are included in a health check could be extended beyond the scope of the MU to MO's of one or more other MU's. According to the concept of Management by Delegation, a single monitored unit can perform the health check for multiple monitored units, resulting in increased scalability. Such a hierarchical approach could be structured such that each MU uses a local health check object and that the MU that performs a joint health check of multiple MU's accesses the local health check object for computing the joint health check. Then the NMS could access the result of the joint health check with a single read access.

Furthermore, a restriction for the resources that are available for computing the value of a health check object could be established. This would effectively avoid that the number of MO's compared for computing the value of a health check object is set by unauthorized entities in a malicious way so high that the MU would get overloaded and not able anymore to sufficiently perform its original function. Alternatively or additionally to the resource restriction, the maximum number comparison operations could be limited to a maximum value that still allows regular operation.

Finally, it is pointed out that there are different possibilities of embodying and further developing the teaching according to the invention in an advantageous way. In this context the reader is referred to the patent claims below.

What is claimed is:

1. A method of monitoring a network, the network including:
    a plurality of units to be monitored, each of which holds managed objects reflecting states to be monitored; and
    a network management system which is allowed to access a managed object of each of the plurality of monitored units through a predetermined network management protocol,
    the method comprising:
    implementing an additional managed object representing the states of a plurality of managed objects of a monitored unit in each of the plurality of monitored units, the additional managed object implemented by aggregating all the states of the plurality of managed objects into a single value; and
    storing the single value as a value of the additional managed object so as to be readable by the network management system.

2. The method according to claim 1, wherein, for the relevant states of the monitored unit, individual limits and/or regular state values are set.

3. The method according to claim 2, wherein the value of the additional managed object indicates one of cases where all relevant states at the monitored unit are within corresponding set limits and where at least one status thereof exceeds a corresponding set limit.

4. The method according to claim 1, wherein a set of managed objects is selected, which are used when the additional managed object is computed.

5. The method according to claim 4, wherein, for calculating the value of the additional managed object, only comparison operations with the set limits and/or regular state values are performed and all comparison results are aggregated into the value of the additional managed object.

6. The method according to claim 1, wherein multiple additional managed objects are implemented at a monitored unit.

7. The method according to claim 6, wherein different additional managed objects implemented at a monitored unit serve different aspects of network monitoring.

8. The method according to claim 6, wherein the additional managed objects implemented at a monitored unit are hierarchically structured into higher level and lower level additional managed objects.

9. The method according to claim 8, wherein, for computing the value of a higher level additional managed object, the values of its lower level health check objects are used.

10. The method according to claim 8, wherein additional managed objects are structured into more than two levels of hierarchy.

11. The method according to claim 5, wherein weights are assigned to the comparison operations that are performed when computing the value of the additional managed object.

12. The method according to claim 11, wherein the value of the additional managed object is computed as the maximum of the weights of all comparison operations for which the value of a managed object exceeds a corresponding limit that has been set.

13. The method according to claim 11, wherein the value of the additional managed object is computed as the sum of the weights of all compare operations for which the value of a managed object exceeds a corresponding limit that has been set.

14. The method according to claim 1, wherein the value of the additional managed object is computed in selectable regular intervals at the monitored unit.

15. The method according to claim 14, wherein, in case the computed value of an additional managed object indicates that at least one of the states exceeds its limit, the monitored unit sends a corresponding message to the network management system.

16. The method according to claim 15, wherein the message sent to the network management system contains an indication of the cause of fault.

17. The method according to claim 16, wherein the indication of the cause of fault is a list of managed objects for which the value exceeds its limits.

18. The method according to claim 17, wherein the monitored units with faulty managed objects are reconfigured by the network management system.

19. The method according to claim 1, wherein a scope of an additional managed object is extended to multiple monitored units by considering the values of managed objects at multiple monitored units when computing the value of the additional managed object.

20. The method according to claim 1, wherein limits are selected for resources to be used for computing the value of the additional managed object.

21. The method according to claim 5, wherein a maximum number of permitted comparison operations is restricted to a predetermined number.

22. A system for monitoring a network, comprising:
a plurality of units to be monitored, each of which holds managed objects reflecting states to be monitored; and
a network management system which is allowed to access a managed object of each of the plurality of monitored units through a predetermined network management protocol,
wherein each of the plurality of monitored units stores a single value obtained representing the states of all the managed objects of the monitored unit, wherein the single value is accessible by the network management system.

23. A network element to be monitored by a network management system, comprising:
a first storage for storing a plurality of managed objects reflecting states to be monitored;
a second storage for storing at least one health check object represented by a single value obtained by aggregating the states of all the managed objects of the monitored unit; and
a management agent for managing the plurality of managed objects and the at least one health check object, wherein the single value is accessible by the network management system.

24. A non-transitory computer-readable storage medium with a computer program stored thereon for instructing a computer to allow a network element to be monitored by a network management system, comprising:
storing a plurality of managed objects reflecting states to be monitored;
storing at least one health check object represented by a single value obtained by aggregating the states of all the managed objects of the monitored unit; and
managing the plurality of managed objects and the at least one health check object so as to be accessible by the network management system.

25. The method according to claim 1, wherein the additional managed object in each of the plurality of monitored units, represents the aggregation of all the other managed objects of each of the plurality of monitored units.

* * * * *